Figure 2:
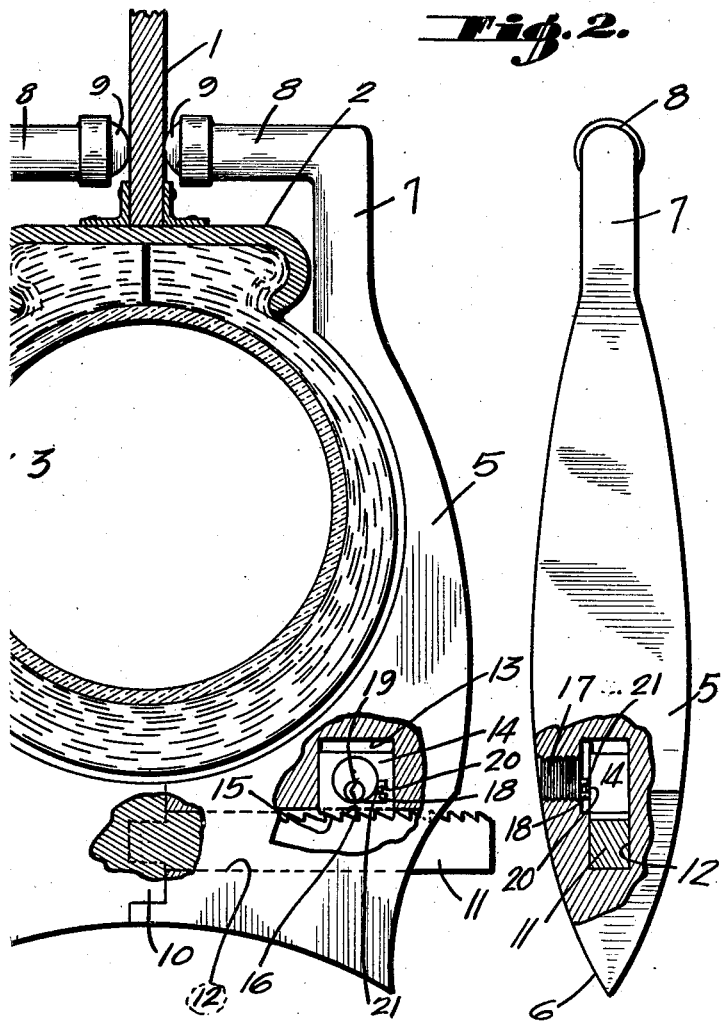

H. M. LAKE AND O. C. BETRY.
AUTOMOBILE THEFT SIGNAL.
APPLICATION FILED MAY 26, 1921.

Patented July 25, 1922.

Harry M. Lake
Owen C. Betry
INVENTORS.

BY
Hazard & Miller
ATTORNEYS.

bar 11, the sections of the signal will be locked relative to one another.

The means for thus moving block 14 into locking or unlocking position may comprise a lock barrel 17 threaded into section 5 of the signal and having a swinging arm 18 actuated by the turning of the key in the keyhole 19 of the lock. The swinging arm 18 is slotted as shown at 20 and engages a pin 21 projecting from block 14, so that the swinging movement of arm 18 as controlled by the turning of the key in the lock will move block 14 back and forth into either locking or unlocking position.

It will be noted that the construction, as thus set forth, provides an extremely durable device which affords an efficient signalling device adapted to be locked onto the tire of a wheel.

Various changes may be made without departing from the spirit of the invention as claimed.

What is claimed is:

1. A device of the character described comprising separable sections adapted to form an annulus, one of said sections having a toothed bolt extending through a bore of the other section, and a locking block in said second section adapted to engage said toothed bolt.

2. A device of the character described comprising separable sections adapted to form an annulus, one of said sections having a toothed bolt extending through a bore of the other section, a toothed locking block movable in said second section for engagement with said toothed bolt, and a lock adapted to move said locking block.

3. A device of the character described comprising two sections fitting together and forming an annulus adapted to surround a tire and rim and affording a blade-shaped projection for engagement with the ground, extensions extending inwardly from said sections, lateral arms extending from the inner ends of the extensions and having end contact members adapted to engage the sides of the wheel disc, said sections being joined by a tongue and recess joint, a bar extending from one of the sections through a bore in the other section and having retaining teeth, a block slidably mounted alongside the bore and having retaining teeth to engage the teeth of the bar, and a lock for operating the block.

4. A device of the character described comprising two sections adapted to fit around a tire, there being tongue and groove connections between the sections, an arm extending from one section through a bore in the other section and having retaining teeth, a block slidingly mounted at the side of the bore and having retaining teeth, a lock for operating the block, extensions projecting inwardly from the sections past the rim of a wheel, and lateral arms extending toward each other from the inner ends of the extensions.

5. A device of the character described comprising two sections adapted to engage a tire and wheel rim, said sections being extensibly connected together by a rod extending from one section through a bore in the other section, retaining teeth upon the rod, and locking means for engaging the retaining teeth so as to hold the sections together upon a wheel.

In testimony whereof we have signed our names to this specification.

HARRY M. LAKE.
OWEN C. BETRY.